United States Patent [19]

Perini

[11] Patent Number: 5,015,000
[45] Date of Patent: May 14, 1991

[54] FLOATING SEAL ARRANGEMENT
[75] Inventor: Richard J. Perini, Holland, N.Y.
[73] Assignee: Moog Controls, Inc., East Aurora, N.Y.
[21] Appl. No.: 544,988
[22] Filed: Jun. 28, 1990
[51] Int. Cl.$^5$ .................. F16J 15/00; F16J 15/16; F01B 31/00
[52] U.S. Cl. ........................ 277/16; 277/27; 277/236; 277/53; 277/174; 92/86; 92/142; 92/165 R; 92/167; 92/168
[58] Field of Search .............. 92/142, 165 R, 167, 92/86, 168; 277/27, 201, 16, 236, 53, 173, 174

[56] References Cited

U.S. PATENT DOCUMENTS

| 3,315,968 | 4/1967 | Hanlon | 277/27 |
| 3,387,198 | 6/1967 | McClure et al. | 277/173 |
| 3,544,118 | 12/1970 | Klein | 277/27 |
| 3,785,253 | 1/1974 | Sandau . | |
| 3,902,404 | 9/1975 | Breit | 92/86 |
| 4,014,555 | 3/1977 | Jacottet | 277/27 |
| 4,076,259 | 2/1978 | Raimondi | 277/27 |
| 4,289,322 | 9/1981 | Traversari et al. | 92/168 |
| 4,406,463 | 9/1983 | Fabrowsky | 277/173 |
| 4,579,349 | 4/1986 | Pipich et al. | 277/16 |
| 4,691,621 | 9/1987 | Hall . | |
| 4,944,215 | 7/1990 | Nimmo et al. | 92/168 |

FOREIGN PATENT DOCUMENTS

| 688232 | 6/1964 | Canada | 92/168 |
| 2945571 | 5/1981 | Fed. Rep. of Germany | 92/167 |

Primary Examiner—Edward K. Look
Assistant Examiner—Thomas Denion
Attorney, Agent, or Firm—Wall and Roehrig

[57] ABSTRACT

A rod seal for a linear hydraulic or pneumatic actuator cylinder includes a seal ring that has a bore that closely matches the diameter of the rods, proximal and distal cylindrical portions and a central annular flange. A seat in the actuator cylinder distal end assembly has proximal and distal cylindrical portions and a central void to receive the rod seal ring proximal and distal portions and central flange respectively. A radial clearance is provided so that the rod seal ring can travel radially, at least for a limited distance, while the rod passes axially through it. Static elastomeric ring seals are provided in the proximal, distal and central portions, and define pressure balancing regions. The rod seal assembly can be constructed at low cost, yet achieve a high degree of sealing with low axial friction characteristics.

8 Claims, 2 Drawing Sheets

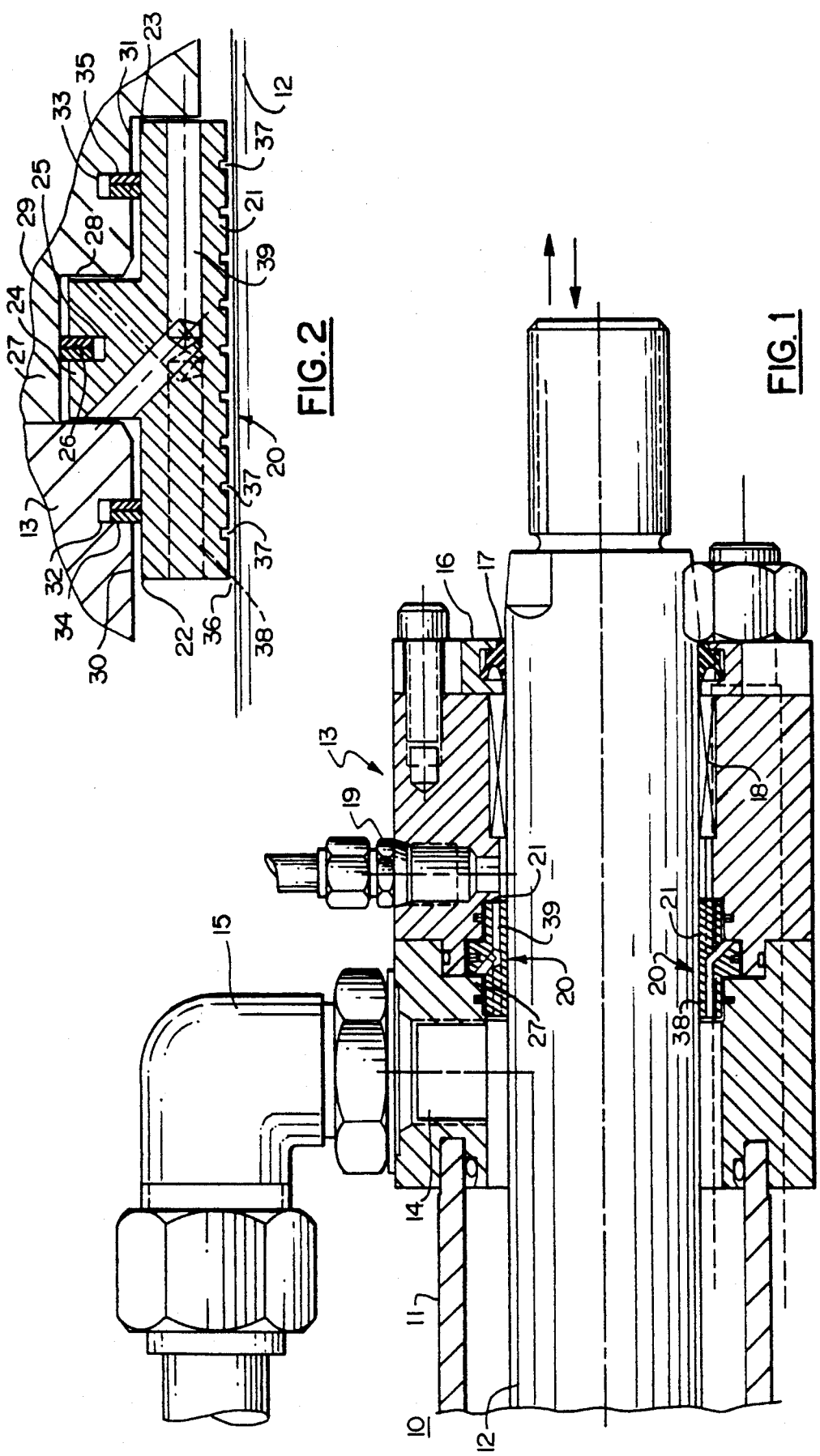

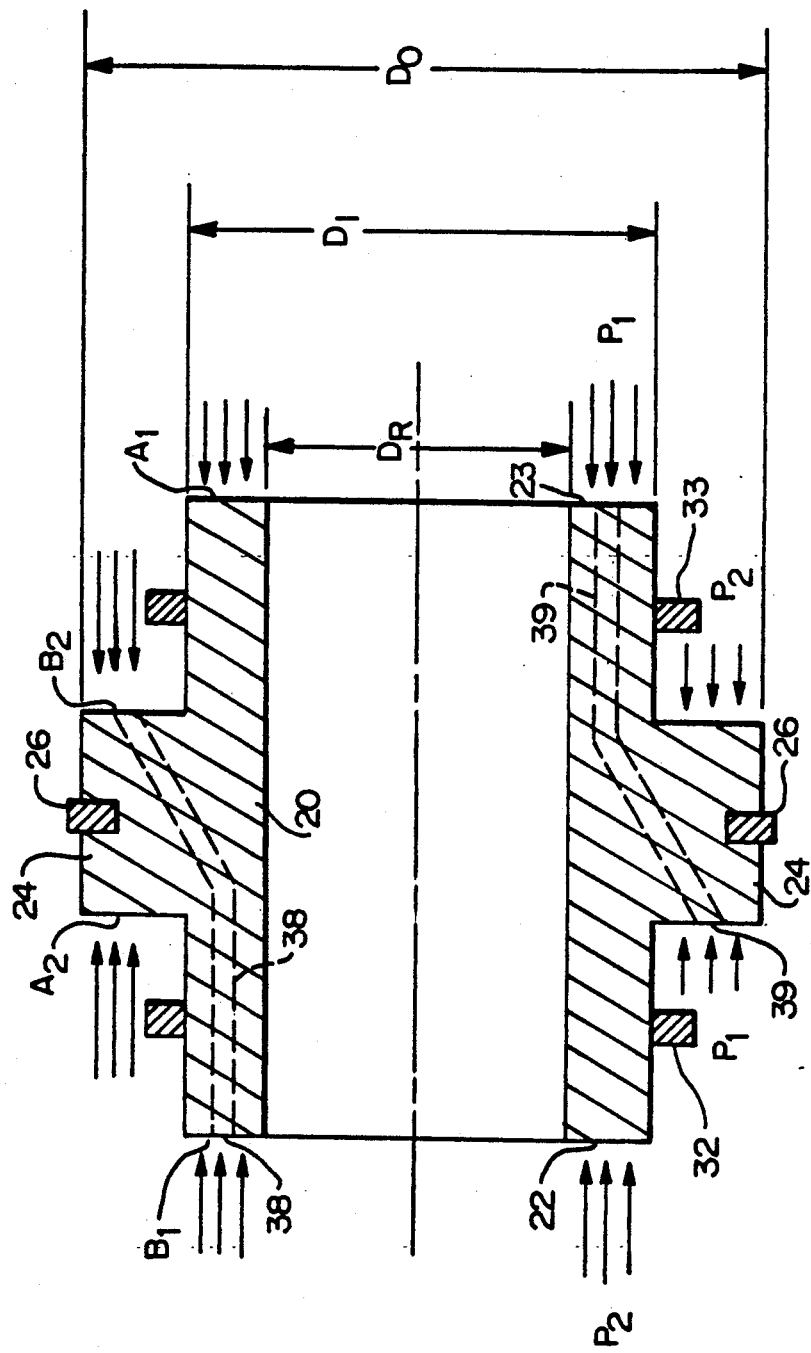

FLOATING SEAL ARRANGEMENT

BACKGROUND OF THE INVENTION

The present invention relates to hydraulic or pneumatic actuators such as linear cylinders, and is more particularly directed to a pressure-balanced rod seal which prevents or limits external leakage where the rod extends through a pressure barrier, but which avoids the high friction that often accompanies pressure actuated rod seals.

Several types of seals are energized by the pressure that they are intended to control. This pressure energization produces a radial force on the seal. The radial force causes seal wear, and decreases the seal life. This requires frequent cylinder refurbishments. In addition, radial force from the pressurized seal is often the main source of friction in the cylinder.

Hydraulic or pneumatic cylinders that are used for specialized service, such as in flight simulators or flying shears, often employ hydrostatic bearings to improve bearing life and friction characteristics. However, these bearings are quite elaborate and are costly to produce, but still produce significant leakage which adds to the hydraulic power requirements.

OBJECTS AND SUMMARY OF THE INVENTION

It is an object of this invention to provide a long-life low-friction rod seal, which can be produced at a low cost, and which avoids the problems of the prior art.

The objects of this invention can be realized with a rod seal that "floats" in the radial direction. To permit this, the rod can be supported by a separate elastomeric ring that serves as a separate bearing.

In an embodiment of this invention, the rod seal employs a rod seal ring that closely fits to the cylinder rod but permits free movement radially, at least for a limited distance, as the rod moves axially within the seal and the rod bearing. Because of the radial play, the axial rod movement is not impeded by the rod seal. The contact stress between the rod and the floating seal is insignificant. Therefore, the friction that is ordinarily developed between the seal and the rod is substantially eliminated. Because of the low friction, long operational life with little wear is expected, even in severe use. In addition, pressure balance areas are provided on the rod seal, and these can be isolated by means of elastomeric static seal rings. These seal rings can be formed of material that reduces radial seal friction to a minimum.

According to an aspect of this invention, the rod seal ring, for example, is formed of cast iron or similar durable material, with the seal ring having an inner diameter that closely matches the diameter of the rod. There are proximal and distal cylindrical portions on the rod seal ring, and a central annular flange that has a diameter that is greater than the diameters of the proximal and distal portions. An annular recess or slot in the central annular flange carries a central ring seal whose outer diameter is at least slightly greater than that of the central annular flange and which enjoys a limited amount of radial play in the annular recess.

A generally cylindrical seat for the rod seal is formed at the distal end of the cylinder housing, and has proximal and distal cylindrical portions to receive the proximal and distal portions of the rod seal ring, leaving a small radial clearance for each. An annular void between the proximal and distal portions of the seat receives the annular flange. This void has a generally cylindrical base that defines a small radial clearance with respect to the annular flange. The central ring seal abuts against this cylindrical face. Proximal and distal annular recesses in the proximal and distal cylindrical portions of the seat receive ring seals that each enjoy some radial play in their respective recesses. These ring seals have inner faces that abut against the cylindrical portions of the rod seals. Pressure balancing areas are defined between the respective proximal and distal ring seals and the central ring seal. Pressure balancing bores extend within the rod seal ring from the proximal end to the space between the central ring seals and the distal ring seal, and from the distal end to a space between the proximal ring seal and the central ring seal.

The above and many other objects, features and advantages of this invention will be more fully understood from the ensuing description of a preferred embodiment, which should be read in connection with the accompanying Drawing.

BRIEF DESCRIPTION OF THE DRAWING

FIG. 1 is a sectional view of a distal portion of a hydraulic actuator or cylinder, incorporating a floating rod seal according to one embodiment of the present invention.

FIG. 2 is an enlargement of a portion of FIG. 1 showing the rod seal ring and seat.

FIG. 3 is a schematic view for explaining pressure balancing of the floating rod seal.

DETAILED DESCRIPTION OF A PREFERRED EMBODIMENT

With reference to the Drawing, and initially to FIG. 1, a hydraulic cylinder 10 is shown in pertinent part. This cylinder can be of the type illustrated generally in U.S. Pat. No. 4,691,621. Here, the cylinder 10 has a cylindrical sleeve 11 and an axially moveable piston rod 12 of circular cross section. The rod 12 has a piston (not shown) which is driven hydraulically (or pneumatically) within the sleeve 11. FIG. 1 features a distal end assembly 13 through which the piston rod 12 exits the sleeve 11. The assembly 13 has a hydraulic port 14 communicating fluid pressure with the interior of the cylinder 10. A connector or fitting 15 is coupled to a hydraulic line. A similar connection or fitting (not shown) is arranged at a proximal end of the cylinder 10.

The distal end assembly 13 includes an elastomeric or metallic bearing ring 18 that supports the rod 12 radially. A packing 17 is contained within a support ring 16, and a fluid bleed port 19 is disposed proximally of the bearing 18.

A floating rod seal assembly 20 serves to control leakage of hydraulic fluid or compressed air into the vicinity of the bearing 18 and the packing assembly 16.

In this embodiment, the rod seal assembly 20 includes a rod seal ring 21 (shown in detail in FIG. 2) which is preferably formed of cast iron or another suitable material. The ring 21 is generally cylindrical, and has a cylindrical proximal portion 22 and cylindrical distal portion 23. There is a central annular land or flange 24 of greater diameter than the portions 22, 23. The flange 24 has an annular recess or slot 25. An elastomeric ring seal 26 carried in the slot 25. In this embodiment, the ring seal comprises two rings disposed back to back. The seal 26 preferably incorporates an elastomer with polytetrafluoroethylene or another similar low friction material to facilitate radial movement of the seal 26 within the recess or slot. Suitable materials could include polyetheretherketone (Arlon)$^R$ or polyimide (Vespel)$^R$.

In the distal end assembly 13 there is formed a seat 27 for the rod seal ring 21. The seat 27 comprises an annular void 28 that has a cylindrical face of slightly greater diameter than the annular flange 24. This face 29 mates with the ring seal 26, generally as illustrated. The seat 27 also has a cylindrical proximal portion 30 and a cylindrical distal portion 31 which receive the proximal and distal portions 22, 23 of the rod seal ring 21. The portions 30, 31 are of slightly greater diameter than the seal ring portions 22, 23 to permit at least a limited amount of radial play or clearance. In each of the portions 30 and 31 there is a respective annular slot or recess 32 and 33 in which is disposed a ring seal 34 or 35 which are each of the same general form as the ring seal 26. There is at least a limited amount of play of the seals 34, 35, within the respective slots 32, 33. An inner circular face of each of these seals 34, 35 mates against the cylindrical surface of the respective ring seal portions 22, 23. In alternative equivalent embodiments, the slots 32, 33 could be machined into the seal ring 20 rather than in the housing assembly 13.

Within the rod seal ring 21 is a central bore 36 that closely matches the diameter of the rod 12. The bore 36 permits free axially movement of the rod 12. Transverse annular grooves 37 in the bore 36 create a labyrinth seal to resist flow of hydraulic fluid or compressed air in the very small clearance between the rod 12 and the wall of the bore 36.

As is apparent from the foregoing, the rod sealing ring 21 is closely fit to the cylinder rod 12 but is free to move radially as the rod moves within the bearing, without being impeded by the seal. The floating seal assembly 20 imposes no radial force on the rod 12, as the radial support is provided entirely at the end bearing assembly 13. As there is substantially no contact stress between the rod 12 and the floating seal assembly 20, the friction that is normally associated with the rod seal of the prior art is not present. This low level of friction gives the cylinder 10 a long operational life, and achieves this at a reduced power requirement.

The floating seal assembly 20 incorporates a pressure balancing arrangement which can be easily explained as follows. First and second pressure balancing regions of the seal assembly 20 are defined by the static sealing rings. The first region is defined between the distal end ring seal 35 and the central ring seal 26, while the second region is defined between the central ring seal 26 and the proximal end ring seal 34. A first pressure equalization bore 38 extends in the rod seal ring 21 from the proximal end thereof to the distal side of the flange 24, while a second pressure equalization bore 39 extends from the proximal side of the flange 24 to the distal end of the rod seal ring 21.

As shown schematically in FIG. 3 by virtue of the pressure equalization bores 38 and 39 there are equal pressures $P_1$ against the proximal annular face of the flange 24 and against the annular end face of the distal end portion 23, and there are also equal pressures $P_2$ against the distal annular face of the flange 24 and against the annular end face of the proximal end portion 22. The end portions 22 and 23 have effective cross sectional areas $A_1$ and $B_1$, while the proximal and distal annular faces of the flange 24 have effective areas $A_2$ and $B_2$. The axial force F on the seal ring 20 is the sum of the products of the areas and pressures respectively applied against them, i.e., $$-A_1P_1 + A_2P_2 + B_1P_2 - B_2P_1 = F$$

The areas depend on the respective diameters $D_R$, $D_I$ and $D_O$. For a given rod diameter, a bore diameter $D_R$ is established, and the diameters $D_I$ and $D_O$ can be selected so that $A_1 = A_2$ and $B_1 = B_2$. This will produce a net axial force of zero for all applied pressures $P_1$ and $P_2$.

It can be appreciated from the foregoing description and from the drawing figures that this seal assembly is of simple construction and can be produced at a low relative cost. The rod seal assembly produces very high fluid sealing characteristics with low axial friction.

While this invention has been described in detail with reference to a preferred embodiment, it should be understood that the invention is not limited to that precise embodiment. Rather, many modifications and variations would present themselves to those of skill in the art without departing from the scope and spirit of this invention, as defined in the appended claims.

What is claimed is:

1. A rod seal for a linear hydraulic or pneumatic actuator cylinder of the type in which a piston rod of circular cross section extends through a radial support bearing at a distal end of the housing and in which a hydraulic port is disposed at a distal end of the housing to apply or withdraw air or hydraulic fluid to actuate the cylinder and move the rod axially, wherein said rod seal comprises a rod seal ring disposed between said port and said radial support bearing, the rod seal ring having an inner diameter that closely matches the diameter of the rod, proximal and distal cylindrical portions of predetermined diameters, a central annular flange having a predetermined diameter greater than the diameters of said proximal and distal portions, an annular recess in said central annular flange, a central ring seal having an outer diameter greater than that of the central annular flange and enjoying at least a limited amount of radial play in said annular recess; a generally cylindrical seat for said rod seal ring formed at the distal end of said cylinder housing and having proximal and distal cylindrical portions to receive the proximal and distal portions of said rod seal ring and defining a radial clearance therebetween, an annular void between the proximal and distal portions of said seat to receive said annular flange and having a generally cylindrical face that defines at least a limited radial clearance with respect to said annular flange and against which said central ring seal abuts; proximal and distal annular recesses in said proximal and distal cylindrical portions of said seat in which are received proximal and distal ring seals, respectively, which enjoy at least a limited amount of radial play in their respective recesses and which have inner faces that abut the proximal and distal portions of the rod seal ring, respectively; first pressure balance means communicating fluid pressure from proximally of the rod seal ring to a first space defined between said central ring seal and said distal ring seal; and second pressure balance means communicating fluid pressure from distally of the rod seal to a second space defined between said proximal ring seal and the central ring seal.

2. The rod seal of claim 1 wherein said rod seal ring is formed of cast iron.

3. The rod seal of claim 1 wherein said first pressure balance means includes at least one bore from a proximal face of said rod seal ring to a distal face of said annular flange.

4. The rod seal of claim 1 wherein said second pressure balance means includes at least one bore from a proximal face of said annular flange to a distal face of said rod seal ring.

5. The rod seal of claim 1 wherein each of said proximal, central and distal ring seals includes a ring formed of a low-friction elastomeric material.

6. The rod seal of claim 5 wherein each said first ring seal includes polytetrafluoroethylene.

7. The rod seal of claim 1 wherein each of said proximal, central and distal ring seals includes a pair of rings disposed side by side.

8. The rod seal of claim 1 wherein said first space and said proximal seal ring portions have substantially the same effective cross sectional areas, and said second space and said distal seal ring portion have substantially the same effective cross sectional areas, so that axial forces on said rod seal ring imposed by fluid pressure tend to balance one another.

* * * * *